US011982810B2

United States Patent
Jacoby et al.

(10) Patent No.: US 11,982,810 B2
(45) Date of Patent: May 14, 2024

(54) OR RELATING TO VARIABLE FOCUSING POWER OPTICAL DEVICES

(71) Applicant: ADLENS LTD, Eynsham (GB)

(72) Inventors: Thomas Norman Llyn Jacoby, Eynsham Oxfordshire (GB); Simon Peter Horrocks, Eynsham Oxfordshire (GB); Daniel Paul Rhodes, Eynsham Oxfordshire (GB); David Mlynski, Eynsham Oxfordshire (GB); Robert Edward Stevens, Eynsham Oxfordshire (GB)

(73) Assignee: ADLENS LTD, Eynsham (GB)

( * ) Notice: Subject to any disclaimer, the term of this patent is extended or adjusted under 35 U.S.C. 154(b) by 795 days.

(21) Appl. No.: 17/043,212

(22) PCT Filed: Mar. 28, 2019

(86) PCT No.: PCT/GB2019/050905
§ 371 (c)(1),
(2) Date: Sep. 29, 2020

(87) PCT Pub. No.: WO2019/186181
PCT Pub. Date: Oct. 3, 2019

(65) Prior Publication Data
US 2021/0033871 A1  Feb. 4, 2021

(30) Foreign Application Priority Data
Mar. 29, 2018 (GB) ..................................... 1805301

(51) Int. Cl.
*G02B 27/01* (2006.01)
*G02B 3/14* (2006.01)
(Continued)

(52) U.S. Cl.
CPC ........... *G02B 27/0172* (2013.01); *G02B 3/14* (2013.01); *G02B 26/0825* (2013.01); *G02B 2027/0178* (2013.01); *G02C 7/085* (2013.01)

(58) Field of Classification Search
CPC ...................................................... G02B 27/01
See application file for complete search history.

(56) References Cited

U.S. PATENT DOCUMENTS

| 4,759,187 A | 7/1988 | O'Hare |
| 5,371,629 A * | 12/1994 | Kurtin ...................... G02B 3/14 |
| | | 351/158 |

(Continued)

FOREIGN PATENT DOCUMENTS

| CN | 102656484 B | 9/2012 |
| TW | 201808213 A | 3/2018 |
| WO | 2017055787 A2 | 4/2017 |

OTHER PUBLICATIONS

Choi, Jong-Moon, et al., "Design of biomimetic robot-eye system with single vari-focal lens and winding-type SMA actuator," International Conference on Control, Automation and Systems 2008 Oct. 14-17, 2008 in COEX, Seoul, Korea, pp. 2533-2537.

(Continued)

*Primary Examiner* — Marin Pichler
*Assistant Examiner* — Justin W. Hustoft
(74) *Attorney, Agent, or Firm* — Sharon E. Crane

(57) ABSTRACT

An adjustable fluid-filled lens or minor assembly 100 comprising a fluid-filled envelope and a supporting structure therefor; the fluid-filled envelope being constituted by a first wall that is formed of a distensible elastic membrane 15 having an exterior optical surface of variable focusing power, a second wall 18 that is spaced from the first wall on a z-axis, and a collapsible peripheral side wall 17 that extends between the first and second walls, and being filled with a substantially incompressible fluid 16; a membrane holding structure 14 that is attached to a peripheral edge of membrane 15 for holding the membrane under tension; and one or more selectively operable actuator assemblies r1, r2, r3 for moving one or more corresponding regions of the peripheral edge of the membrane on the z-axis towards and away from the second wall 18 for controlling the profile of the peripheral edge of the membrane; wherein the or each actuator assembly comprises a connecting member 91, 92, (Continued)

93 that is attached to the membrane or membrane holding structure at a respective actuation point, a linear actuator 531, 532, 533 that is mounted to the supporting structure and a linkage 81, 82, 83 that is connected between the connecting member and an actuation point a1, a2, a3 on the linear actuator; wherein the linear actuator is a linear SMA actuator comprising an array of SMA wires 53 that are coupled together to work in parallel and which extend transversely of the z-axis, and the linkage is configured for converting linear motion of the actuation point of the SMA actuator in a direction transverse the z-axis to linear motion of the connecting member on the z-axis, thereby to move the corresponding region of the peripheral edge of the membrane 5 towards or away from the second wall 18.

22 Claims, 11 Drawing Sheets

(51) Int. Cl.
*G02B 26/08* (2006.01)
*G02C 7/08* (2006.01)

(56) References Cited

U.S. PATENT DOCUMENTS

| | | | | |
|---|---|---|---|---|
| 6,449,434 | B1 * | 9/2002 | Fuss | F03G 7/065 |
| | | | | 396/97 |
| 6,517,203 | B1 * | 2/2003 | Blum | G02C 7/083 |
| | | | | 351/41 |
| 9,671,621 | B2 | 6/2017 | Holland et al. | |
| 2007/0030573 | A1 * | 2/2007 | Batchko | B33Y 30/00 |
| | | | | 359/665 |
| 2015/0092275 | A1 * | 4/2015 | Hirokubo | G02B 26/001 |
| | | | | 359/578 |
| 2015/0378067 | A1 | 12/2015 | Stevens et al. | |
| 2017/0191470 | A1 * | 7/2017 | Elliot | F03G 7/065 |

OTHER PUBLICATIONS

Son, Hyung-Min, et al., New variable focal liquid lens system using antagonistic-type SMA actuator, Proceedings of the 4th International Conference on Autonomous Robots and Agents, Feb. 10-12, 2009, Wellington, New Zealand, pp. 476-479.
International Search Report and Written Opinion for PCT/GB2019/050905 dated Jul. 18, 2019, 14 pages.
Office Action issued for Taiwan Patent Application No. 108111225 dated Mar. 20, 2023, 6 pages.

* cited by examiner

Detail E

View D

View Up

View Down

OR RELATING TO VARIABLE FOCUSING POWER OPTICAL DEVICES

CROSS REFERENCE TO RELATED APPLICATION

This application is a 35 U.S.C. 371 National Phase Entry Application from PCT/GB2019/050905, filed Mar. 28, 2019, which claims priority to United Kingdom Patent Application No. 1805301.7, filed Mar. 29, 2018, the disclosures of which are incorporated herein in their entirety by reference, and priority is claimed to each of the foregoing.

FIELD OF THE INVENTION

The present invention relates to variable focusing power optical devices such as variable optical power lenses and mirrors, and has particular reference to variable focusing power optical devices of the kind having an optical surface formed by a distensible membrane that forms one wall of a fluid-filled envelope of adjustable fluid pressure to cause the membrane to distend outwardly or inwardly, thereby changing the focusing power of the optical surface. The optical devices may be used in corrective eyewear and in AR and VR headsets. The invention also relates to a membrane assembly comprising such a distensible membrane for use in devices of the aforementioned kind.

BACKGROUND OF THE INVENTION

WO 2013/144592 A1, the contents of which are incorporated herein by reference, discloses fluid-filled lens or mirror assembly of variable focusing power which comprises a fixed support; a fluid-filled envelope, one wall of which is formed by an elastic membrane that is held under tension around its edge by a flexible membrane supporting member, the membrane supporting member being coupled to the fixed support at a plurality of discrete control points round the supporting member by respective engaging members for controlling the position of the membrane edge relative to the fixed support at the control points, and the member being unconstrained between said control points; and a selectively operable pressure adjuster for adjusting the pressure of the fluid within the envelope, thereby to adjust the shape of the membrane.

Whilst the lens or mirror assembly of WO 2013/144592 A1 achieves acceptable results, an ongoing problem associated with liquid lenses, particularly non-round lenses, is the need to create an adjustable lens with good optics. "Good" in an adjustable ophthalmic lens typically means that the adjustable optical surface is spherical or spherocylindrical, or nearly so. To that end, the non-circular boundary of the membrane must form a projection of itself onto multiple spheres or toroids as shown in FIGS. 1A and 1B of the accompanying drawings.

Note, in relation to coordinates and directions that the undeformed membrane plane is used to define Cartesian axes (x, y, z), as shown in FIGS. 1A and 1B, where x-y lie in the plane of the membrane when flat, with z along the optical axis. In cylindrical polar coordinates, z also lies on the optical axis and the membrane in the sweep of the coordinates r-φ (where φ is azimuth). Also defined is an "along track" coordinate, which is the distance around the eye-shape from azimuthal zero. The (x, y) plane here defined may be referred to as the membrane plane even when the membrane is in a distended spherical state. These coordinates will be referred to below.

For membranes that form variable curvature surfaces in a sealed compression lens, a theoretical volume-conserving neutral contour will exist that is common across membrane states. The neutral contour is defined by the intersection of a datum plane with the membrane, such that the volume bounded by the datum plane and membrane is equal above and below the datum plane. In other words, the fluid volume inside the neutral contour is equal to that displaced outside of it. The centre of the neutral contour is both the point of maximum distension of the membrane and the optical centre (hereafter OC) of the membrane. For variable curvature spherical surfaces the neutral contour is circular whereas for toric surfaces, the neutral contour is ellipse. Spherical-refractive optical performance at each actuation state is dependent on shaping the boundary to the ideal projection onto the sphere. Similar conditions apply to astigmatic lenses where the boundary is projected onto toric surfaces. To that end, the optical architect will be assisted in designing for an arbitrary eye-shape if (s)he can put active control points at any arbitrary position around the lens. This may be difficult in practice, however.

For example, a lens assembly of the kind disclosed by WO 2013/144592 A1, part of which is shown in FIG. 2, has a neutral circle that intersects the eye-shape, enabling one to put fixed-z static control points S there, while three active control points A at a temple are moved by a cam actuator located at that side. As mentioned above, this lens assembly performs generally satisfactorily, but in the absence of active control at a nasal region, there is a requirement for improved optics in that region.

SMAs (shape-memory alloys) are materials that can be made to undergo a solid state phase change from a Martensitic to austenitic crystal structure at an elevated temperature. When in the Martensite phase, an SMA wire is typically in a 3% stretched form, such that on heating to the austenite phase the material "remembers" its undeformed shape and contracts by approximately 3%. Repeat-use SMA actuators have a load on the wire, for instance by a return spring or flexure, such that on cooling to the Martensite phase the load stretches the material back to its deformed length. The transition temperature is a function of the composition of the material, with typical commercially available wires for room-temperature applications having transition temperatures in the range 60° C. to 100° C.; for example, Flexinol® nickel-titanium alloy wire is available from Dynalloy® with a transition temperature of either 70° C. or 90° C. Such temperatures are low enough to be easily achieved by passing a current down the wire, and high enough that the wire may cool quickly to the Martensite phase.

FIG. 3 shows an example of a graph of electrical resistance R versus temperature T for an SMA wire under load, while FIGS. 4A and 4B are respectively graphs of voltage V and current A against time t (arbitrary units) for a pulse-width-modulated SMA actuator. The increasing temperature curve of R versus T has three segments 3001, 3002, 3003 corresponding to the Martensite, phase change and austenite states respectively. If the imaginary part of the SMA wire's complex impedance is low and the pulse width is not too short then the current response to the voltage pulses shown in FIG. 4A is as shown before time 1 in FIG. 4B. The current rises quickly to a maximum value, whence it reduces as the temperature increases and hence resistance increases in the Martensite phase 3001 during the pulse. After time 1, the pulse frequency increases thereby leaving less time for the wire to cool down between pulses. The increase in pulse frequency causes the temperature of the wire during the pulses to increase such that the wire eventually undergoes the Martensitic to Austenitic phase change. As can be seen in FIG. 4B, as the temperature in the wire increases, the resistance of the wire drops rapidly during the phase change 3002. When the wire is in the austenitic phase 3003 resistance increases with temperature and so the current drops during each pulse. By monitoring the current draw during voltage pulses to an SMA wire, control electronics are able to determine when a given section has transitioned and contracted or extended.

GB 2290151 A discloses a lens in the form of a flexible transparent material suspended within a circular frame using a shape memory alloy wire by virtue of a lattice arrangement. The wire may be connected to an electrical circuit. Upon electrical actuation of the shape memory alloy wire, the lens is made to stretch, changing its focal length, and changing the direction of light rays passing through it. On deceasing electrical actuation of the wire, the lens is made to contract, returning it to its original focal length and returning the light rays passing through it to their original path. Switching the electrical current on and off, alternately actuating and not actuating the shape memory alloy wire, results in the lens alternately stretching and contracting, alternately changing the direction of light rays passing through it.

Son et al. 2009. *Optics Express*, 17 (16): 14339-14350 disclose an injection-type liquid lens that incorporates a cam-operated injector driven by controlled by an antagonistic winding-type SMA actuator.

Three major limitations on SMA wires as actuators are:
i) the maximum useable actuation force and cooling time of a wire both go as the square of the wire diameter (for instance data from the Dynalloy® website), so that a wire cannot be both fast cooling and high force;
ii) the actuation distance is typically only 3% of the wire's length; and
iii) the wire is a two-state actuator.

Hasan et al. 2016. *Optics Express*, 24 (12): 13334-13342 disclose a circular compression-type liquid lens that uses helical SMA springs as actuators in which strain is traded with force to provide a strain of about 10%.

SUMMARY OF THE INVENTION

The present invention seeks to overcome the first of the aforementioned limitations by using an array of co-acting SMA wires to provide sufficient force while retaining fast cooling.

The second limitation is addressed by wrapping the actuator around the eye-shape, so that long wires (e.g. having a length of up to 40 mm or 50 mm) may be fitted in the space-constraints of eyewear such that actuation movements of the order of a millimetre may be possible.

The third limitation is sought to be overcome by addressing the wire arrays in sections so that fine control of the wires length and hence actuation of the lens is permitted.

According to a first aspect, therefore, the present invention provides an adjustable fluid-filled lens or mirror assembly comprising a fluid-filled envelope and a supporting structure therefor. The fluid-filled envelope may be constituted by a first wall that is formed of a distensible elastic membrane having an exterior optical surface of variable focusing power, a second opposite wall that is spaced from the first wall on a z-axis, and a collapsible peripheral side wall that extends between the first and second walls. The fluid-filled envelope may be filled with a substantially incompressible fluid. The lens or mirror assembly may further comprise a membrane holding structure that is attached to a peripheral edge of the membrane for holding the membrane under tension and one or more selectively operable actuator assemblies for moving one or more corresponding regions of the peripheral edge of the membrane on the z-axis towards or away from the second wall for controlling the profile of the peripheral edge of the membrane. The or each actuator assembly may comprise a connecting member that is attached to the membrane or membrane holding structure at a respective control point, a linear actuator that is mounted to the supporting structure and a linkage that is connected between the connecting member and an actuation point on the linear actuator. The linear actuator may be a linear SMA actuator comprising an array of SMA wires that are coupled together to work in parallel. In accordance with the invention, the linear actuator is configured and arranged such that each SMA wire extends transversely of the z-axis. The linkage may be configured for converting linear motion of the actuation point of the SMA actuator in a direction transverse the z-axis to linear motion of the connecting member in a direction substantially parallel to the z-axis, thereby to move the corresponding region of the peripheral edge of the membrane towards or away from the second wall.

The SMA wires may be made from any SMA with a transition temperature low enough to be easily achieved by passing a current down a wire made from the SMA, and high enough that the wire may cool quickly to the Martensite phase. Suitably, the SMA may be nitinol or a nickel-titanium alloy. Alternatively, the SMA may be copper-aluminium-nickel alloy.

In some embodiments, the adjustable fluid-filled lens or mirror assembly may be a variable focusing power liquid lens assembly. The collapsible side wall may extend between the first and second walls around the periphery of the fluid-filled envelope. Suitably, the membrane may be made from a material that is transparent, at least across a range of visible frequencies. The incompressible fluid may comprise an optically clear refractive fluid. The second wall may also be transparent in the same way as the membrane.

The pressure of the fluid within the envelope may be adjustable to cause the distensible membrane to distend outwardly or to retract inwardly. In some embodiments, the pressure of fluid within the envelope may be adjusted by adding or withdrawing fluid to or from the envelope, for example using a suitable fluid injector. In other embodiments, the pressure of the fluid within the envelope may be adjusted by compressing or expanding the envelope, for example by displacing one or more regions of the membrane holding structure towards or away from the second wall. In some embodiments, a combination of fluid-injection and compression may be used, as disclosed, for example, in co-pending International patent application no. PCT/GB2019/050131, the contents of which are incorporated herein by reference.

The distensible membrane may form an optical surface of variable focusing power as the shape of the membrane is changed. The optical surface of the membrane may have a spherical, spherocylindrical or other shape of variable curvature which is defined by one or more Zernike polynomials selected from $Z_k^{\pm j}$, wherein k is 2, 3 or 4 and j is 0 or an integer that is less than k.

The lens or mirror assembly defines an optical axis that may extend substantially orthogonally to a plane defined by the membrane when it is undistended. By 'optical axis' is mean a line through the lens assembly or reflecting off the mirror assembly that results in no change in direction of a light ray passing therealong. Suitably, the lens assembly of the invention is configured such that in use, a user looks through the lens assembly straight ahead along the optical axis. The z-axis may extend substantially orthogonally to a datum plane defined by the membrane in its undistended state. In embodiments of the invention where the assembly is configured such that the membrane is not able to achieve a fully undistended planar state, the z-axis may extend substantially orthogonally to a datum plane defined by the membrane in a theoretical undistended state.

In accordance with the present invention, one or more actuators may be placed around the periphery of the membrane holding structure for displacing one or more regions of the membrane holding structure towards or away from the second wall in a direction substantially parallel to the optical axis for controlling the shape of the membrane holding structure as the membrane is distended or relaxed. The membrane may be round or non-round. Where the shape of the membrane is non-round, or the membrane is required to deform other than spherically—for example to include an element of astigmatism (cylinder)—this is important to ensure the membrane distends with the correct three-dimensional shape. Suitably, the one or more actuators may be attached to the membrane holding structure at one or more corresponding actuation points that are spaced around the periphery of the membrane.

In some embodiments, the membrane holding structure may comprise a membrane supporting ring. The supporting ring may be substantially circular or non-round. The supporting ring may be a bendable membrane supporting ring. The supporting ring may be bendable in a plane defined by the z-axis and tangential to the membrane edge.

In some embodiments, the membrane holding structure may be held at a substantially fixed distance from the second wall at one or more hinge points. Suitably, the hinge points may be located at or near points on the supporting ring where the above described theoretical volume-conserving neutral contour on the membrane intersects the datum plane of the membrane, the volume-conserving neutral contour representing a boundary where the volume bounded by the datum plane and the membrane remains equal inside and outside the contour at all actuation states of the lens assembly. The theoretical volume-conserving neutral contour may be a circle.

The membrane holding structure may be suitably unsupported and free to bend between the hinge points and actuation points.

In accordance with the invention, the SMA wires of each linear SMA actuator are arranged to extend orthogonally or obliquely to the z-axis. Where the SMA wires extend obliquely with respect to the z-axis, they may extend on an axis or in a plane that is oriented to subtend an angle of more than about 45° with the z-axis; suitably more than about 60°; and more suitably greater than about 75° or 80°. For instance, each SMA wire may extend on an axis or in a plane that is arranged at an angle of about 85-90° with respect to the z-axis. As described below, this arrangement allows relatively long SMA wires to be incorporated within the form factor of the lens assembly. In some embodiments, each SMA wire may be arranged to extend across the z-axis from one end juxtaposed part of the edge of the membrane to another end juxtaposed an opposite part of the boundary. Thus, in this arrangement, the SMA wires may extend on an axis or in a plane that is generally parallel or oblique to the datum plane of the membrane as described above. However, the SMA wires may conveniently be arranged to extend circumferentially with respect to the edge of the membrane. Thus, in some embodiments, the SMA wires may extend around at least part of the periphery of the membrane through an azimuthal arc of at least about 30°; suitably at least about 60° and preferably more than about 90°. For example, in some embodiments, each SMA array may extend along an arc that is circumferential of the membrane of about 90-150°, e.g. about 120°. The arc length of each SMA wire array may be the same of different. Where the SMA wires extend circumferentially around part of the membrane edge as described above, they may follow an arc that lies in a plane substantially orthogonal to the z-axis or is titled with respect to the z-axis as described above such that the SMA wires form a shallow helical arrangement around the membrane edge. Suitably, the SMA wire arrays may be supported on the supporting structure. Conveniently, the SMA wire arrays may be supported on an outward facing side surface of the support structure or a duct attached thereto, as described in more detail below.

In some embodiments, the or each actuator may comprise a ribbon actuator assembly which incorporates an SMA wire array. The ribbon may have a transverse axis, across the longitudinal dimension of each wire, which is arranged substantially parallel or at an acute angle to the z-axis.

The SMA wire array may comprise a plurality of individual SMA wires. Suitably, each SMA wire array may comprise between 5 and 100 individual SMA wires; more preferably between 20 to 50 individual SMA wires. However, it should be understood that in some embodiments each wire array may comprise fewer than 5 SMA wires or more than 100 SMA wires. The individual SMA wires may be held at each end by a yoke that is attached to a hard member—for example a hard member of the kind described in more detail below—or one or more parts connected thereto, or to a housing for the lens assembly. The linear SMA actuator may comprise a first yoke member that is attached to the SMA wire array at one end thereof and anchored to the supporting structure. The linear SMA actuator may comprise a second yoke member that is attached to the SMA wire array at another end thereof.

The second yoke may be attached to the membrane holding structure through a suitable linkage, such that power developed by the SMA wire array is transmitted to the membrane holding structure at the actuation point for displacing the membrane holding structure in the region of the actuation point towards the second wall in a direction substantially parallel to the optical axis. Suitably, the linkage may comprise a pivoting linkage and a tension member. The tension member may be attached to the second yoke member. The linear SMA actuator may comprise a return spring that is connected to the tension member and anchored to the supporting structure. At the one end, the second yoke may also be attached to a hard member or a part connected thereto through a suitable return spring for returning the SMA wire array to its extended state. The linkage may be connected to the tension member at the actuation point.

The pivoting linkage may be pivoted to a hard member or a part connected thereto or to a housing for the lens or mirror assembly. The linkage may be substantially "L" shaped and have a first end, a second end, and an elbow positioned between the first end and the second end. The pivoting linkage may be pivotally secured to the supporting structure at the elbow of the pivoting linkage.

The lens or mirror assembly may comprise a plurality of actuator assemblies for controlling the position of multiple regions of the peripheral edge of the membrane relative to the second wall. The lens or mirror assembly may comprise two or more, typically three to five, actuators. The linear SMA actuators may be arranged substantially end to end around the periphery of the membrane.

Suitably the second wall is substantially rigid. In some embodiments, the supporting structure may thus comprise a hard member having a surface which forms the second wall of the fluid-filled envelope. Alternatively, the supporting structure may comprise a hard member having a surface which supports a layer of material that forms the second wall of the fluid-filled envelope. In some embodiments, the hard member may comprise an optically clear plate or hard lens. The hard lens may have an opposite, outer optical surface having a defined (fixed) focusing power. Alternatively, the hard lens may be planar with no optical power of its own. The hard lens may be a glass or polymer, or any material that would be known to a person skilled in the art as suitable for use as an optical lens.

As mentioned above, an advantageous feature of the present invention is that the ribbon actuator comprises a plurality of individual SMA wires.

As described above, the SMA wire array may be arranged circumferentially around at least part of the periphery of the hard member. In this way, long SMA wires may be used having a length of, for example, up to 40 or 50 mm. It will be understood that longer SMA wires with lengths of up to 100 mm could be used. It will also be understood that shorter SMA with lengths of down to 20 mm could be used. The diameter of the wires may be between 0.01 mm and 1 mm, preferably between 0.025 mm and 0.51 mm. The SMA wire array may be mounted to a peripheral side surface of the hard member.

Further, in accordance with the invention, separate longitudinal sections of the SMA wire array may be addressable using a suitable electronic bus. The electronic bus may be configured to supply a pulse-width-modulated voltage to the individual longitudinal sections of the array. In this way, the electronic bus may be configured to supply current to the SMA wire arrays to heat and cause a phase transformation in the wire arrays, for example between the Martensitic and Austenitic phases, in order to actuate the SMA wire arrays. The electronic bus may be configurable to supply a range of voltages to the individual longitudinal sections of the array at a range of frequencies. Alternatively, the electronic bus may be configurable to provide a range of voltages at specific fixed frequency; or a specific fixed voltage at a range of frequencies. In this way, the length of the SMA wire array may be controlled more precisely than addressing each wire in its entirety. The electronic bus may be configured to supply a different frequency of pulse-width-modulated voltage to each of the individual sections of the array. Alternatively, the electronic bus may be configured to actuate the SMA wire arrays using a DC or AC current without pulse width modulation. The SMA wire arrays may be actuated using either voltage or current control When one or more sections of the SMA wire array are de-actuated by transforming the SMA wire from the phase in which it is shorter, for example the Austenitic phase, back to the phase in which it is longer, for example the Martensitic phase, the wires may be restored to their extended length by a return spring.

The minimum section length should be between L/10 and L/50, where L is the total length of the SMA wire or wire array. The sections may be equal in length or may have different lengths. The human eye is able notice the difference in strength between lenses of varying power when the lenses have a difference in optical power of approximately $1/4$ dioptres. It may be advantageous to change the power of the lens in increments of $1/8$ dioptres of less to appear to be actuating smoothly to a user. For a lens having a 2 dioptre to 4 dioptre power range it may be preferable that the power of the lens is changed in fixed increments in between 16 to 32 steps over its power range. This can be achieved by dividing the wire array into sections of varying length. For example, by dividing a wire of length L into six sections: L/32, L/16, L/8, L/4, L/2, L/32 then any one or a combination of those sections can be actuated to actuate the SMA wire array in 32 equal steps between the maximum and minimum lengths of the SMA wire.

The adjustable fluid-filled lens or mirror assembly may comprise a control circuit that is configured to supply pulse modulated voltage to the or each SMA actuator, for example via an electronic bus; wherein the frequency of the pulses is variable for adjusting the length of the SMA wires. The control circuit may be configurable to provide pulses in frequencies of between 10-50 Hz to help reduce the perceptibility to the user of the heating and cooling cycles of the SMA wires.

When the distensible membrane is held around its periphery by a bendable supporting ring, the assembly may comprise control electronics for controlling the operation of the one or more SMA actuators for displacing the supporting ring at the one or more actuation points according to a desired focusing power. The desired focusing power may be able to be manually set. The control electronics may be operable to set the focusing power automatically.

Each SMA actuator may comprise a plurality of electrical supply wires for directing current to longitudinally contiguous sections of the SMA wire array. The electrical supply wires may be arranged in a ribbon cable. The electrical supply wires may be connected to an electronic bus of the type described above.

The linear SMA actuator may be attached to the supporting structure to extend circumferentially around at least part of the supporting structure. The SMA wire array may be housed within an elongate duct or housing that is fixedly secured to the supporting structure. The elongate duct or housing may be made from a resilient material, for example a polymer. Alternatively, The elongate duct or housing may comprise a comb-like structure having grooves accommodating the SMA wires. The elongate duct or housing may be electrically conducting or electrically insulating.

Suitably, the SMA wire array may be housed within a suitable housing that is attached to a side surface, preferably a peripheral side surface, of the supporting structure. The individual SMA wires may be accommodated within a plurality of comb-like structures that are spaced longitudinally along the SMA wire array. Individual SMA wires may be accommodated within grooves of the comb-like structures. Individual SMA wires may be positioned against a cylindrical side surface within the comb-like structure. The comb structures may be electrically conducting or non-conducting. Where the duct or housing is electrically insulating the electrical supply wires may be configured to individually address each SMA wire in an array to provide electrical current to the SMA wires. Where the duct or housing is electrically conducting the electrical supply wires may be configured to address the duct or housing to provide electrical current to the SMA wires via the duct or housing.

In some embodiments, the lens assembly may comprise one, two, three or more actuation points with associated ribbon actuators.

As described in more detail below, the lens assembly of the invention may further include suitable control electronics for controlling the operation of the one or more ribbon actuators for displacing the supporting ring at the one or more actuation points according to the desired focusing power of the membrane. The desired focusing power of the membrane may be set manually by user, using a suitable user-operated control automatically, for example using an eye-tracking device to determine a point of gaze or degree of vergence of a user and adjusting the focusing power of the lens assembly accordingly.

The present invention thus provides a device for applying active control at remotely spaced points around a fluid-filled lens of arbitrary shape using one or more shape memory alloy (hereafter SMA) wire arrays as small form-factor, high force and silent actuators. When applied to a non-round fluid-filled lens it allows hitherto uncontrolled regions to be formed to the desired shape and improves the optics and hence experience of the user. For example, a non-round lens may have one or more actuators at a temple side and at least one actuator at a nasal side, the actuator at the nasal side being positioned at an angle where the lens is most curved and thereby being configured to provide active control in the uncontrolled nasal region indicated in FIG. 2.

The invention is not limited to fixed volume lenses adjusted by compression, but can also be used with fluid-injection lenses, or even hybrid injection-compression lenses and mirrors.

The adjustable fluid-filled lens or mirror assembly may comprise at least one eye-tracking device to determine the point of gaze or degree of vergence of a user and adjust the focusing power of the lens or mirror assembly accordingly. Such eye-tracking devices are disclosed in international patent application number PCT/GB2014/051837, the contents of which are incorporated herein by reference In some embodiments, the adjustable fluid-filled lens or mirror assembly may comprise one or more sensors for determining the actuation state of the lens or mirror assembly. The one or more sensors may be selected from the following list: a pressure sensor for measuring the pressure within the fluid; a temperature sensor for measuring the temperature of the SMA wires; a curvature sensor or curvature sensor array for sensing the radius of curvature of the membrane and/or supporting ring, return spring force sensors for measuring the force in the return springs, linkage rotation sensors to measure the rotational position of the pivoting linkages, and limit switches to ensure the ring does not deflect beyond maximum and minimum limits.

According to a second aspect, the present invention provides an adjustable fluid-filled lens or mirror assembly comprising: a fluid-filled envelope having a first wall formed by a distensible membrane that is held around its periphery by a supporting ring, a second wall provided by a surface of a substantially hard member that is spaced from the first wall or a layer of material that is supported on the surface of the hard member, and a collapsible side wall extending between the first and second walls around the periphery of the fluid-filled envelope; the fluid-filled envelope being filled with a substantially incompressible fluid; and the pressure of the fluid within the envelope being adjustable to cause the distensible membrane to distend outwardly or to retract inwardly; the distensible membrane having an optical surface of variable focusing power as the shape of the membrane is changed; wherein the lens assembly defines an optical axis that extends substantially orthogonally to a plane defined by the membrane when undistended; and one or more actuators placed around the periphery of the supporting ring for displacing one or more regions of the supporting ring towards or away from the second wall in a direction substantially parallel to the optical axis for controlling the shape of the supporting ring as the membrane is distended or relaxed; wherein the one or more actuators are attached to the supporting ring at one or more corresponding actuation points that are spaced around the supporting ring; the or each actuator comprising a ribbon actuator assembly that incorporates an SMA wire array which is arranged circumferentially around at least part of the periphery of the hard member; the SMA wire array comprising a plurality of individual SMA wires which are held at each end by a yoke that is attached to the hard member or one or more parts connected thereto or to a housing for the lens assembly; and wherein the yoke at one end is attached to the supporting ring through a linkage such that power developed by the SMA wire array is transmitted to the supporting ring at the actuation point for displacing the supporting ring in the region of the actuation point towards the second wall in a direction substantially parallel to the optical axis.

It will be appreciated that features described in relation to the adjustable fluid-filled lens or mirror assembly according to the first aspect of the present invention may also be incorporated into the adjustable fluid-filled lens or mirror assembly according to the second aspect of the invention.

According to a third aspect, the present invention provides eyewear comprising one or more lens assemblies according to the first aspect of the invention or to the second aspect of the invention. The eyewear may comprise spectacles, sunglasses, or an AR or VR headset.

According to a fourth aspect, the present invention provides an AR/VR headset comprising one or more lens assemblies according to the first aspect of the invention or to the second aspect of the invention. The AR/VR headset may comprise at least one pair of lens assemblies that are aligned on an optical axis with a transparent display interposed therebetween. The AR/VR headset may comprise a head-up display (HUD).

Following is a description by way of example only with reference to the accompanying drawings of embodiments of the various aspects of the present invention.

Figure 6:
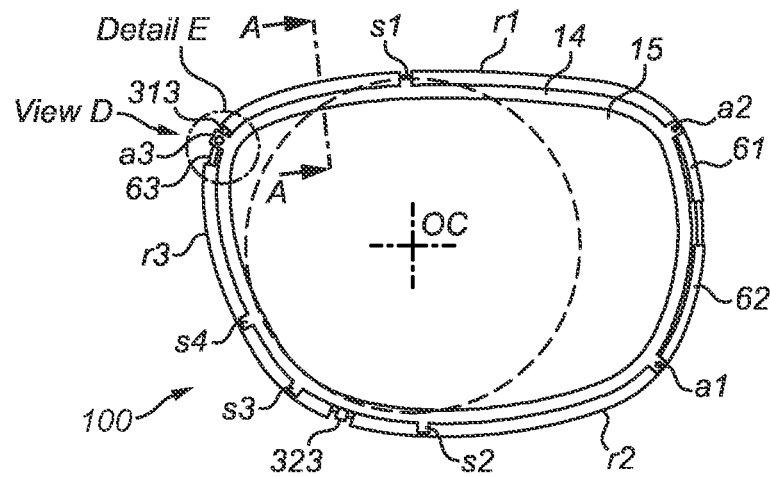
FIG. 6 is a front view of part of an adjustable lens assembly in accordance with one embodiment of the present invention.
Figure 10:
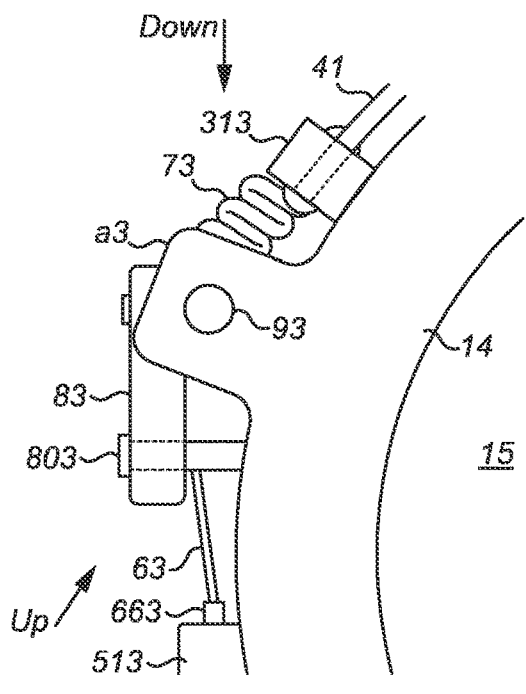

FIG. 10 is an enlarged front view of Detail E indicated in FIG. 6, which shows details of an actuation tab of the lens assembly.

Figure 11:
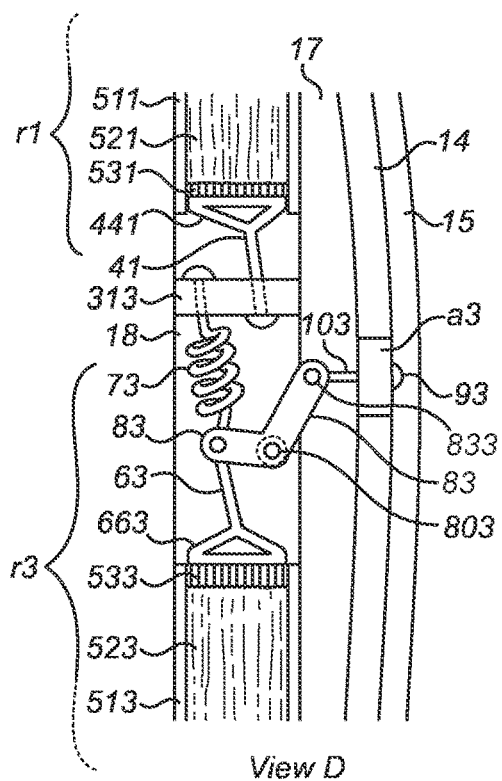

FIG. 11 is an enlarged side view of part of the lens assembly of FIG. 6 as indicated by View D in FIG. 6.

Figure 12:
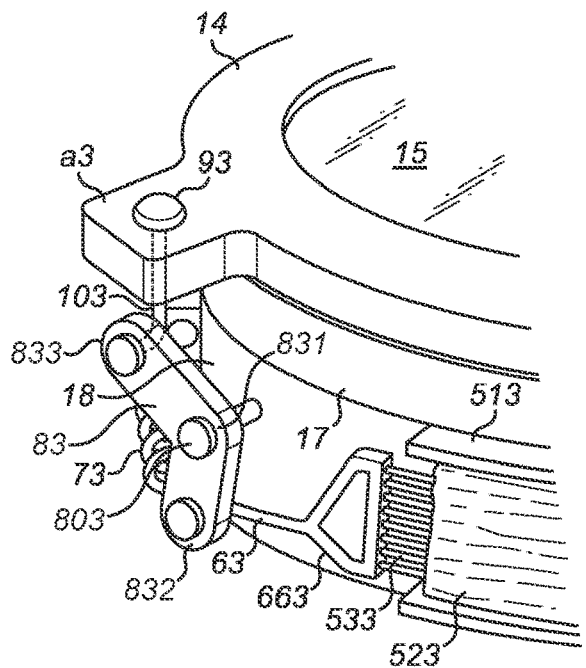
Figure 13:
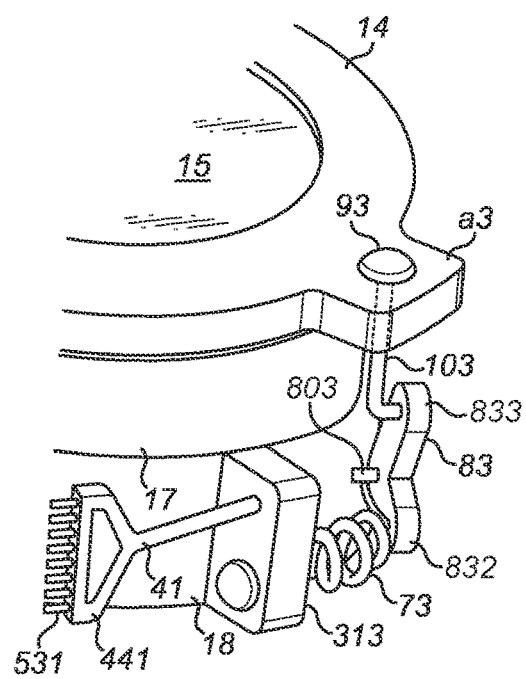

FIGS. 12 and 13 are respectively perspective views from below and above and to the front of part of the side of the lens assembly as indicated by the corresponding arrows in FIG. 10.

Figure 14:
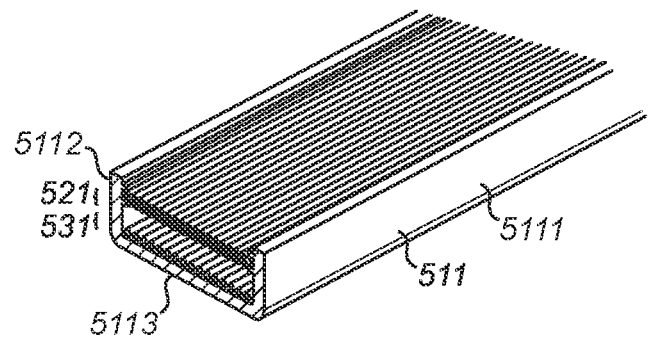

FIG. 14 is a perspective view of one of the ribbon actuator assemblies r1 which show a flat ribbon-like array of SMA wires and an electronic bus for supplying current to the wires.

Figure 15:
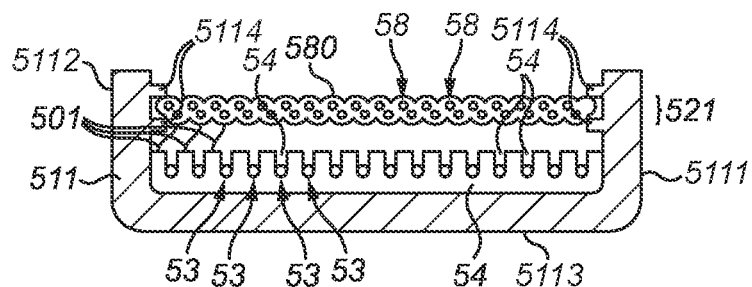

FIG. 15 is a cross-section through the ribbon actuator assembly r1 of FIG. 14 which shows a comb-like structure for supporting the individual SMA wires.

Figure 16:
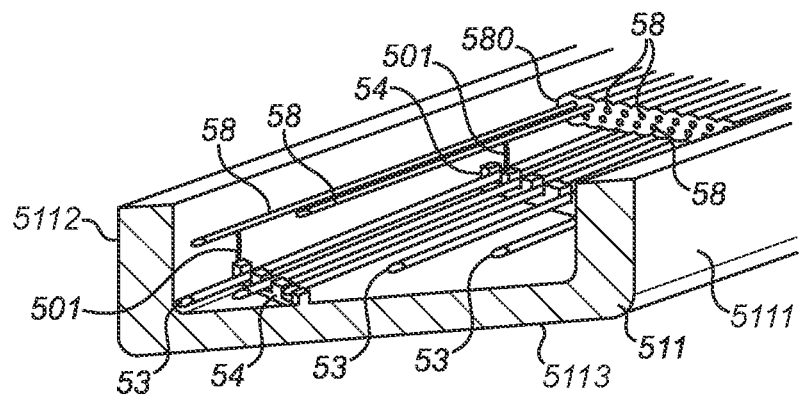

FIG. 16 is a part-cutaway perspective view of the ribbon assembly r1 of FIGS. 14 and 15 in which the comb-like structure is electrically conductive and each section of the SMA wire array is connected between adjacent comb-like structures to the electronic bus by a single connecting wire.

Figure 17:
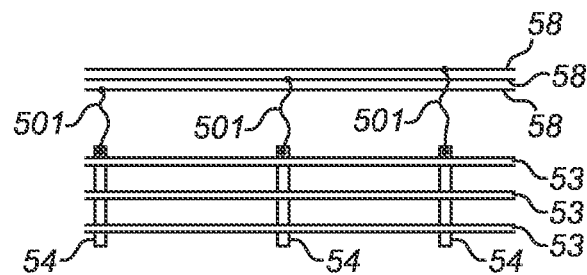

FIG. 17 is a schematic view of part of the ribbon assembly r1 of FIG. 16 showing connection of several longitudinal sections of the SMA wire array to the electronic bus.

Figure 18:
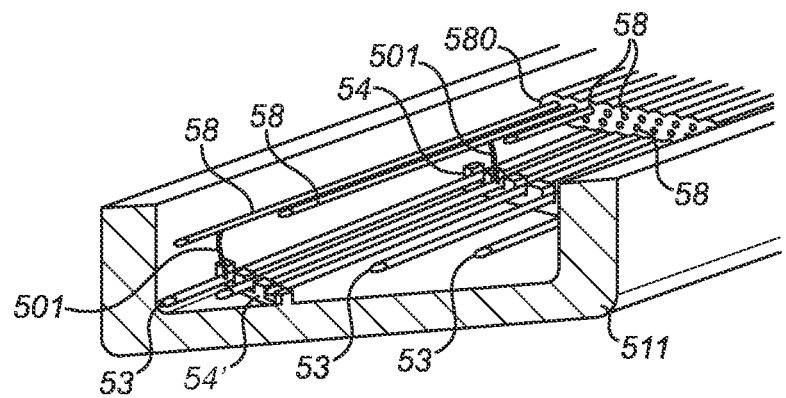

FIG. 18 is a part-cutaway perspective view of a variant of the ribbon assembly r1 of FIGS. 14 and 15 in which the comb-like structure is non-conductive and each section of the SMA wire array is connected to the electronic bus by multiple connecting wires (only 2 are shown for clarity).

Figure 19:
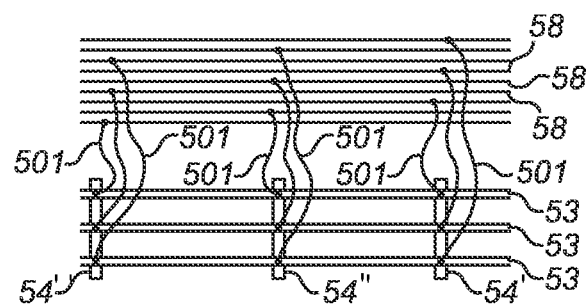

FIG. 19 is a schematic view of part of the variant ribbon assembly r1 of FIG. 18 showing connection of several longitudinal sections of the SMA wire array to the electronic bus using multiple connecting wires for each section (3 are shown for clarity).

Figure 20:
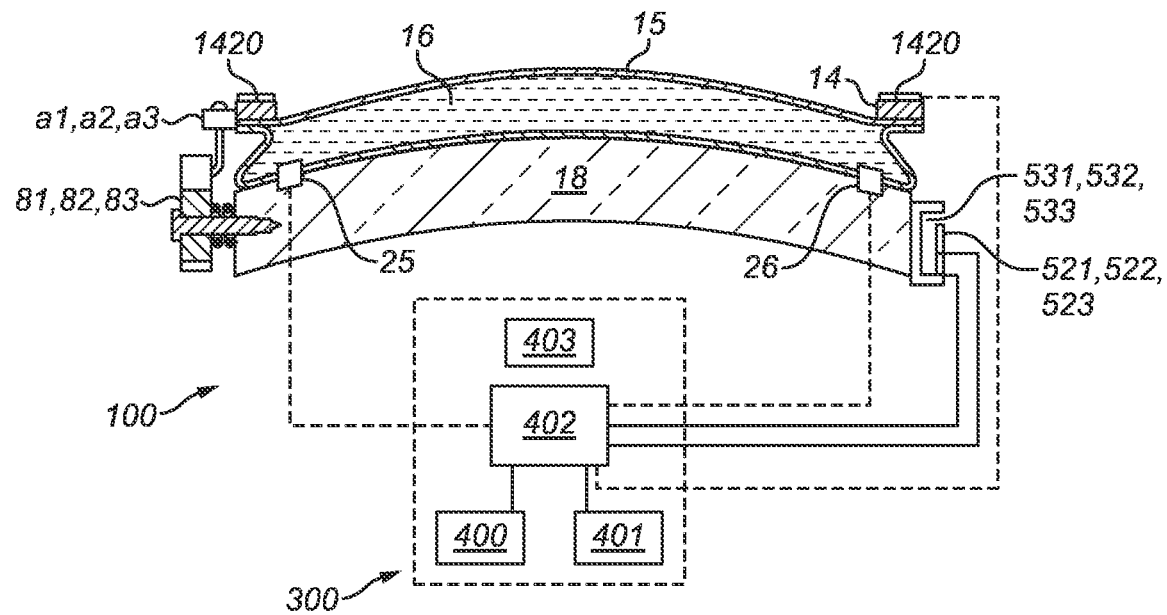

FIG. 20 is a schematic cross-section through the lens assembly of FIG. 6 which shows an electronic control system for controlling operation of the lens assembly.

Figure 21:
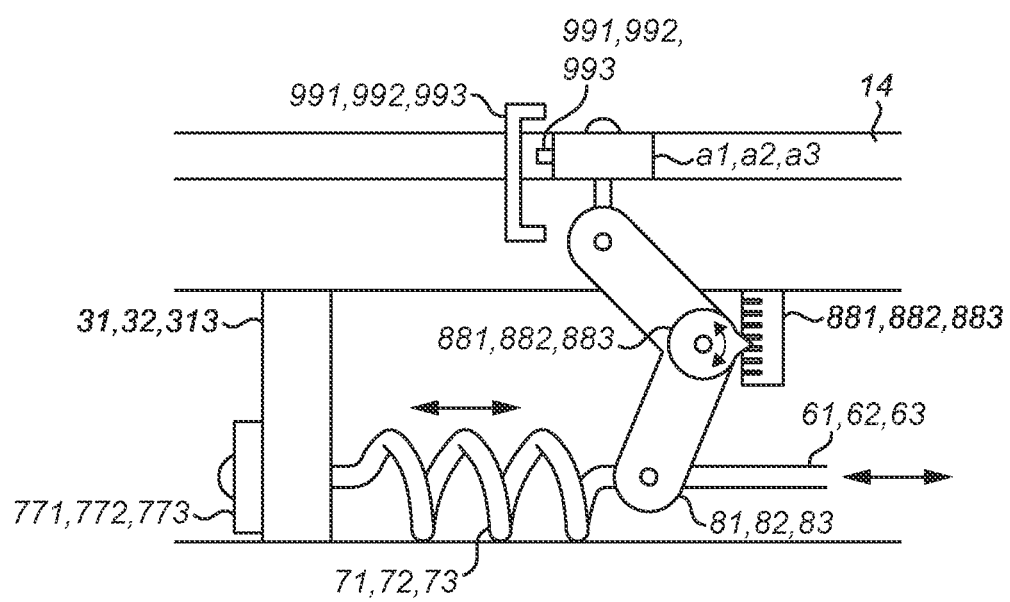

FIG. 21 is an enlarged side view of part of one of the actuator assemblies of the lens assembly of FIG. 6 which shows various sensors for use by the electronic control system of FIG. 20.

Figure 22:
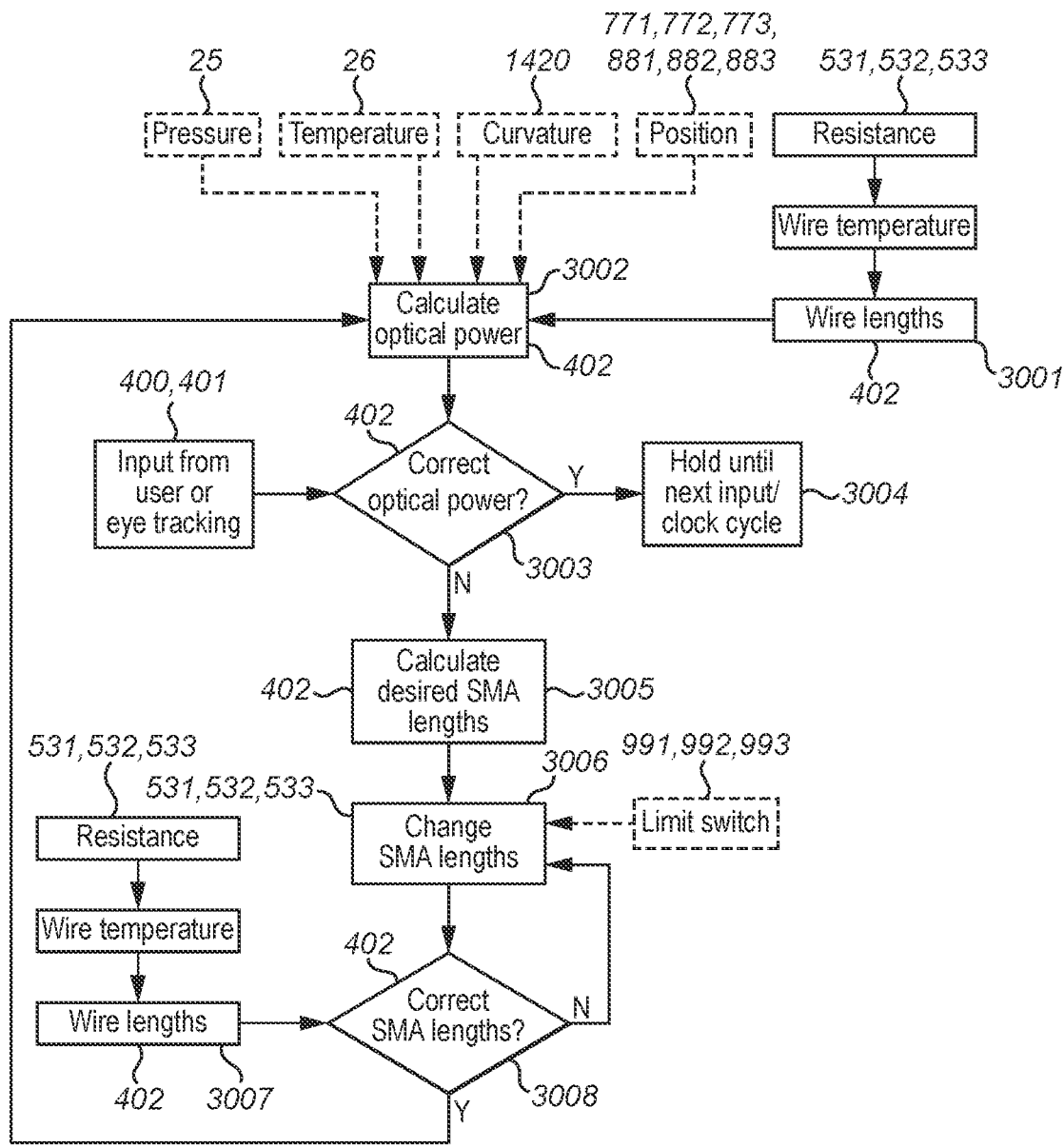

FIG. 22 is a flow diagram of a control loop of the electronic control system of FIG. 20.

DETAILED DESCRIPTION OF THE INVENTION

Example 1: Non-round Fluid Filled Lens with Three Active Control Points

Figure 1A:
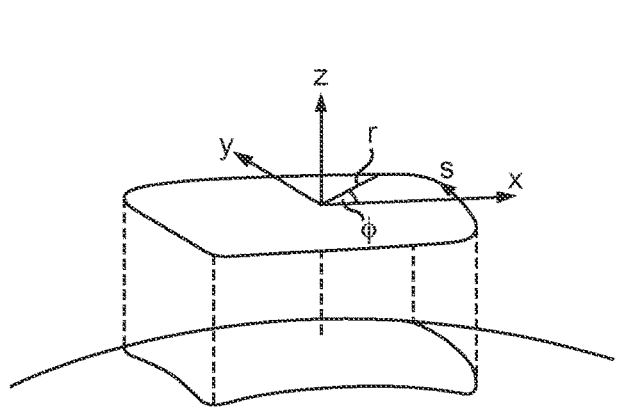
FIGS. 1A and 1B illustrate schematically how a non-circular boundary of a membrane of a variable focusing power lens assembly having a spherical optical surface of variable curvature must form a projection of itself onto multiple spheres for good optical quality.
Figure 1B:
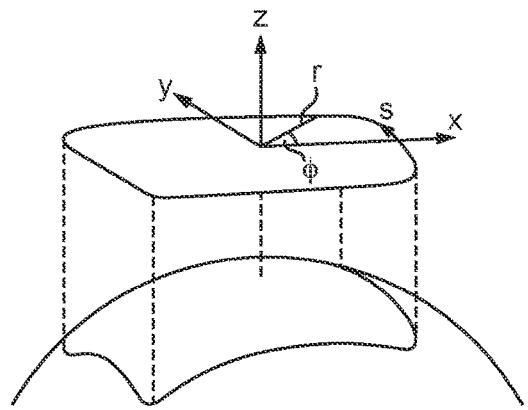
Figure 2:
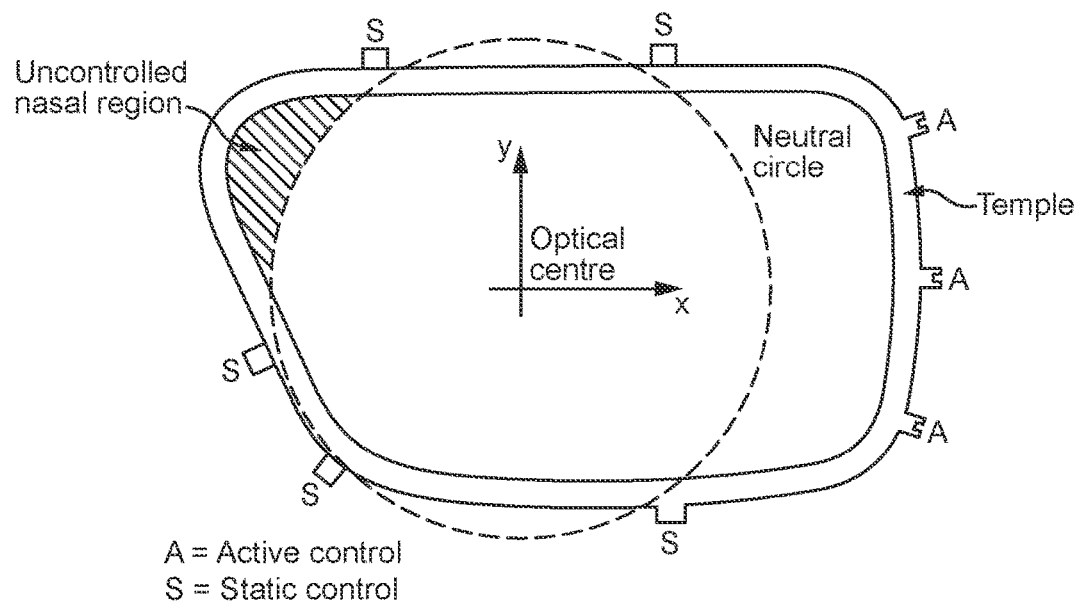
FIG. 2 shows a membrane supporting ring for an ophthalmic lens from the front with actuation points A in the temple region and hinge points S where a circular neutral contour intersects the positions of the hinge points.
Figure 3:
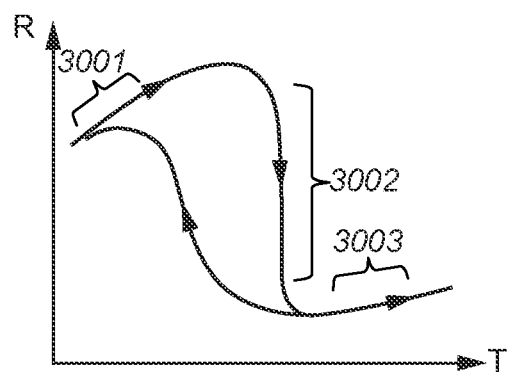
FIG. 3 is a graph of electrical resistance versus temperature for an SMA wire under load.
Figure 4A:
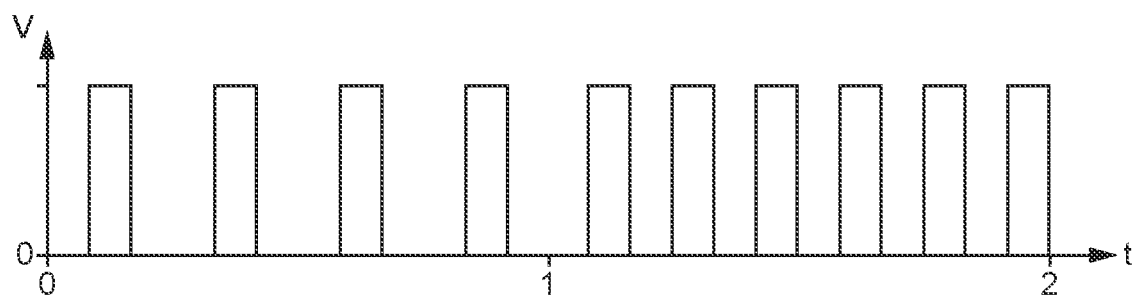
FIGS. 4A and 4B are respectively graphs of voltage and current against time for a pulse-width-modulated SMA actuator.
Figure 4B:
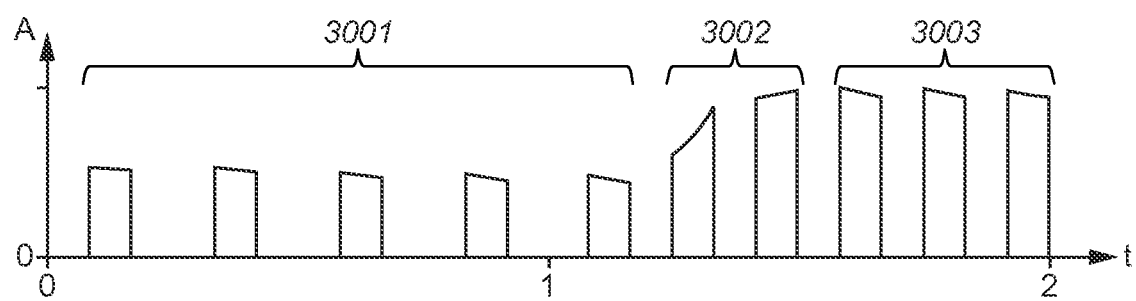
Figure 5:
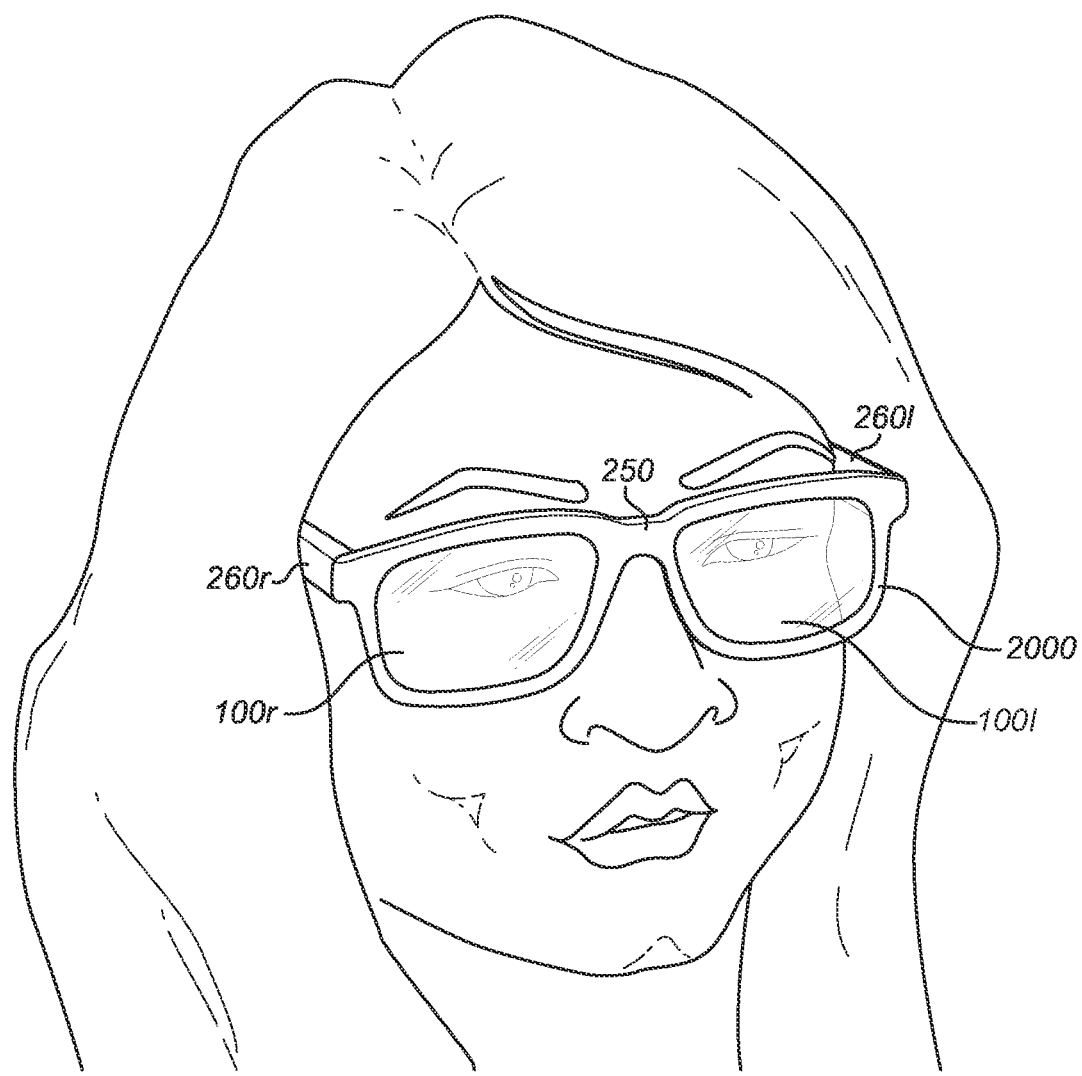
FIG. 5 shows an article of eyewear worn by a user.

FIG. 5 shows a pair of eyeglasses 2000 with right and left adjustable lens assemblies 100r, 100l that incorporate a first embodiment of the invention. Lens assemblies 100r, 100l are housed in frame front 250, and right and left temple arms 260r, 260l are provided. Temple arms 260r, 260l may contain one or more batteries and control electronics, and frame front 250 may contain electronics, batteries, and cameras for eye-tracking. Devices for receiving user input directly, such as touch switches; or indirectly via a "master" device, such as a Bluetooth receiver, may also be provided.

The terms "right" and "left" as used herein refer to the anatomical right and left sides, respectively, of the user of the eyeglasses as shown in FIG. 5. The terms "front", "forwardly" and the like and "rear" (or "back"), "rearwardly" and the like refer to locations that are respectively further away from, or closer to, the user's face. "Top" and "bottom" relate to the usual upright orientation of the user. Parts of the eyeglasses that are closer to the user's nose are referred to herein as being a "nose" or "nasal" part or the like, while parts that are closer to one of the user's temples are a "temple" part or the like.

As can be seen from FIG. 5, the left- and right-hand lens assemblies 100r, 100l are non-round.

They have the same shape as each other, but are mirror images of one another about the user's sagittal plane, which extends through the nose-bridge of the eyeglasses 2000. Each of the lens assemblies 100l, 100r extends transversely from a respective nose-side of the frame front 250, adjacent the nose-bridge of the eyeglasses 2000, which rests on the user's nose when the eyeglasses 2000 are worn, to a temple side of the frame front 250, where the frame front 250 joins with respective temple arms 260r, 260l.

Figure 7:
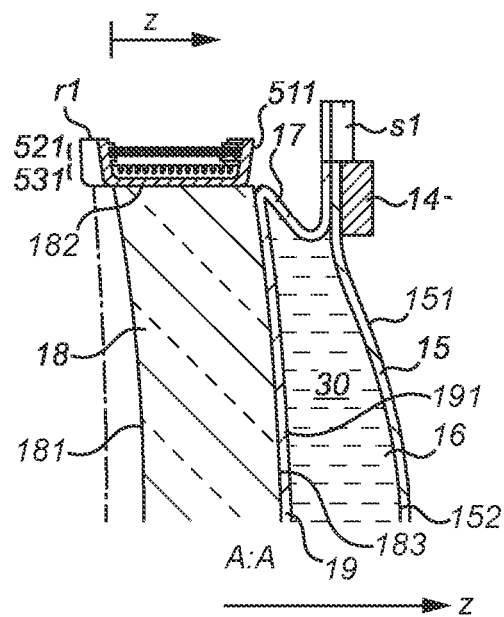
FIG. 7 is a side view of part of the adjustable lens assembly of FIG. 6 in cross-section on the line A-A of FIG. 6.

The construction of the left-hand lens assembly 100l is shown in more detail in FIGS. 6 and 7, but it will be understood that the following description applies equally to the right-hand lens assembly 100r. In the subsequent description of the lens assemblies 100r, 100l we will therefore drop the side-identifiers "l" and "r".

The lens assembly 100 thus comprises a non-round hard lens 18 which is formed from a hard, optically clear material of the kind that is commonly used for making ophthalmic lenses. The hard lens 18 has a front surface 183, a rear surface 181, and a side surface 182, the side surface being parallel to the z-axis. The hard lens may have any suitable shape and may be a converging lens, a diverging lens, or it may have substantially no optical power on its own. The hard lens 18 may be a prescription lens for correcting a refractory error in the user's vision. As illustrated in the FIG. 7, the hard lens 18 may suitably be a meniscus lens with a convex front surface and a concave rear surface.

The lens assembly 100 also comprises a distensible membrane 15 having a non-round shape that corresponds to the shape of the hard lens 18 that is positioned in front of and spaced apart from the hard lens 18 on the z-axis as shown in FIG. 7. The membrane 15 is suitably formed from a sheet of a thermoplastic polyurethane (e.g. Elastollan® 1185A10, which is commercially available from Messrs. BASF) and has a thickness of about 220 µm. Other suitable materials that may be used for the membrane 15, as well as the other components of the lens assembly 100, are disclosed by WO 2017/055787 A2, the contents of which are incorporated herein by reference.

The membrane 15 is held under tension around its periphery by a resiliently bendable supporting ring 14 which serves as a membrane holding structure. As described in more detail below, the membrane 15 forms a front optical surface for the lens assembly 100, with the optical power of the lens assembly 100 being determined by the curvature of the front surface 151 of the membrane 15 and the rear surface 181 of the hard lens 18 because the refractive indices of the membrane 15, fluid, and hard lens 18 are substantially the same.

In the present embodiment, the supporting ring 14 is fabricated from a sheet of stainless steel and has a thickness of about 0.55 mm, but more generally the ring may have a thickness in the range about 0.50-0.60 mm, or the supporting ring may comprise a stack of two or more ring elements instead of a single ring. The front surface 151 of the membrane 15 is bonded to the supporting ring 14 with a light curable adhesive (e.g. Delo® MF643 UV curing epoxy adhesive) or other means and is held at a line tension of about 200 Nm$^{-1}$ to maintain the optical quality of the front surface 151 of the membrane 15.

The membrane 15 and ring 14 are connected to the hard lens 18 by a dish-shaped part 19 comprising a rear surface 191 and collapsible side wall element 17. The rear surface 191 of the dish-shaped part 19 is substantially the same shape as the front surface 183 of the hard lens 18 and is bonded the front surface 183 of the hard lens 18. The side wall element 17 is bonded to the rear surface 152 of the membrane 15. Bonding of dish-shaped part 19 to the membrane and hard lens 18 can be achieved using a suitable adhesive (e.g. Delo® MF643 UV curing epoxy adhesive) or other means such, for example, as ultrasonic welding, laser welding and the like. The dish-shaped part 19 and membrane 15 thereby form a sealed cavity 30.

The cavity 30 of the envelope is filled with a sensibly incompressible, optically clear, refractive fluid 16. The fluid 16 should be colourless and have a refractive index of at least about 1.5 to match the refractive indices of the hard lens 18 and membrane 15. Suitably the refractive index of the membrane 15 and fluid 16 should be matched, so that the interface between the membrane 15 and fluid 16 is substantially imperceptible to the user. The fluid 16 should have low toxicity and low volatility; it should be inert and exhibit no phase change above about −10° C. or below about 100° C. The fluid 16 should be stable at high temperatures of at least about 80° C. and exhibit low microbial growth. In some embodiments, the fluid 16 may have a density of about 1 g/cm$^3$. Various suitable fluids are available to those skilled in the art, including silicone oils and siloxanes such, for example, as phenylated siloxanes. A preferred fluid is pentaphenyltrimethyltrisiloxane.

When the lens assemblies 100 are mounted in the frame front 250, the ring 14 is able to move within the frame front 250 towards and away from the hard lens 18, as will be described in more detail below, with the side wall element 17 folding on itself or extending respectively to allow such movement.

In other embodiments of the invention, more than one supporting ring 14 may be used. For example, the membrane 15 may be sandwiched between two similar supporting rings as described, for example, in WO 2013/144533 A1, the contents of which are herein incorporated by reference. In the present embodiment, only one ring is described for simplicity.

As mentioned above, the overall optical power of the lens assembly 100 is determined by the curvature of the front surface 151 of the membrane 15 and the rear surface 181 of the hard lens 18. As the rear surface 181 of the hard lens 18 is fixed, the optical power of the lens assembly 100 is controlled by causing the distensible membrane 15 to distend outwardly or to retract inwardly by adjusting the pressure of the fluid 16 within the envelope 30. In the present embodiment, the pressure of the fluid 16 within the envelope 30 is adjusted by controlling the profile of the boundary of the membrane 15, particularly the curvature of the supporting ring 14, in a plane defined by the z-axis and the tangent to the boundary of the membrane 15, by displacing one or more circumferential regions of the supporting ring 14 towards or away from the hard lens 18. As best seen in FIG. 6, the membrane supporting ring 14 is formed with a plurality of peripherally spaced, outwardly protruding integral tabs for enabling the position of the ring 14 along the z-direction to be controlled in those locations. In this embodiment there are four static control tabs s1 to s4, which are constrained in the z-direction at a fixed distance from the front surface 183 of the hard lens 18, and three active control tabs a1 to a3 which are moveable in the z-direction. Means for constraining the static control tabs s1 to s4 in the z-direction are provided but are omitted from the drawings for clarity.

Figure 8A:
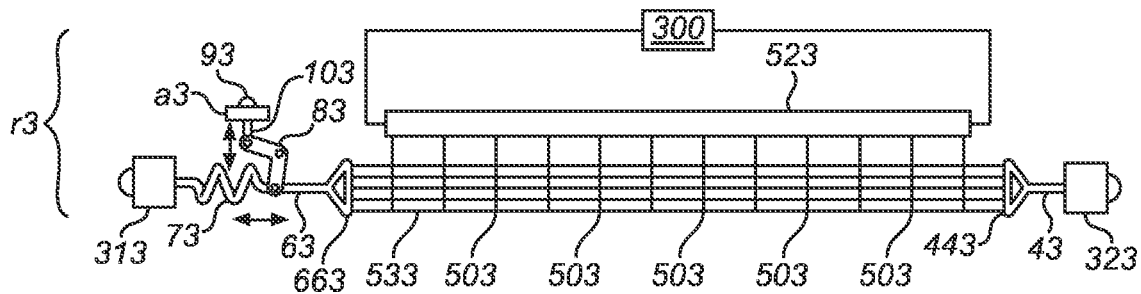
FIGS. 8A, 8B and 8C are schematic details of three similar ribbon actuator assemblies r1, r2 and r3 of the lens assembly of FIG. 6.
Figure 8B:
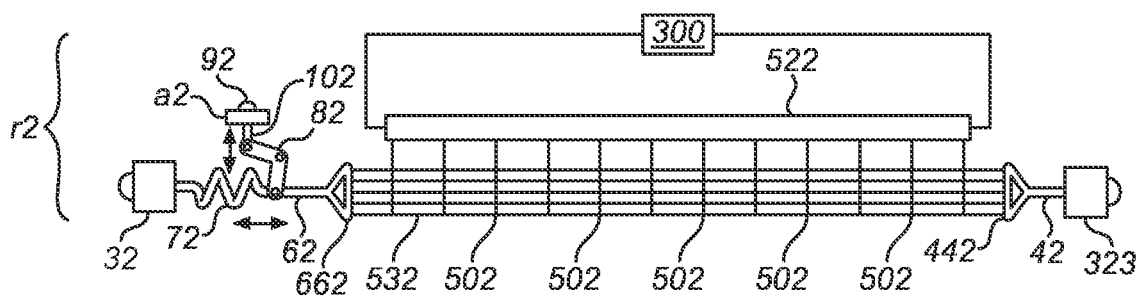
Figure 8C:
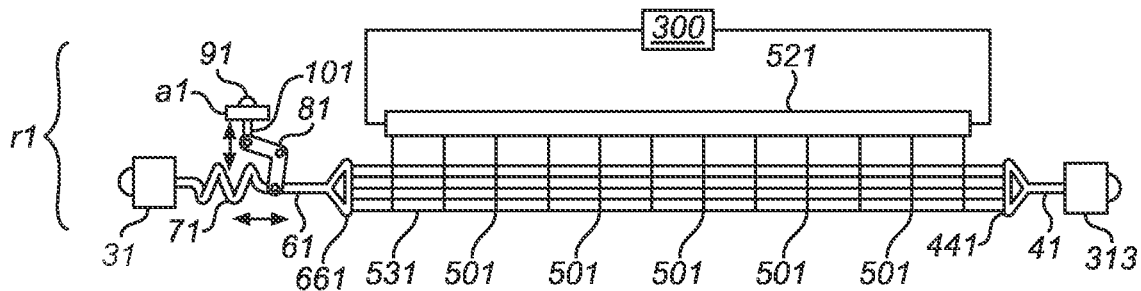
Figure 9:
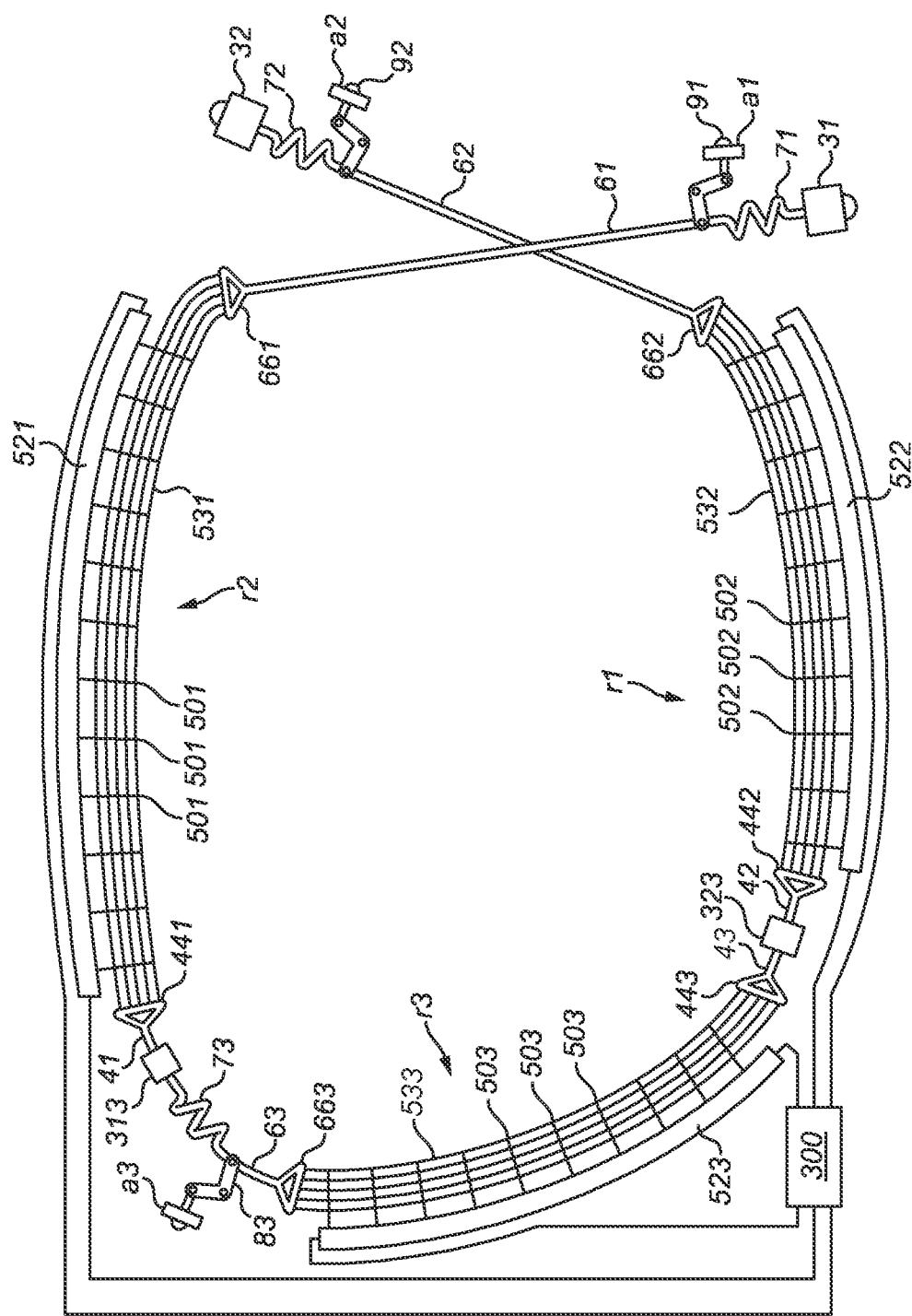
FIG. 9 is a schematic front view showing the peripheral arrangement of the ribbon actuator assemblies r1, r2 and r3 in the lens assembly of FIG. 6 in which the ribbon actuator assemblies are shown as twisted towards the view for clarity.

Active control tabs a1, a2, a3 engage corresponding ribbon actuator assemblies r1, r2, r3 that are positioned around the periphery lens assembly 100, as shown in FIG. 9, for moving the active control tabs a1, a2, a3 in the z-direction in relation to the hard lens 18 and thereby adjust the optical power of the lens assembly 100, as described in more detail below. It should be noted that FIG. 9 is a schematic figure showing how the SMA actuator assemblies r1, r2, r3 may be connected around the periphery of the lens 100 to correspond to the arrangement shown in FIG. 6. As can be seen, the actuator assemblies r1, r2, r3 are fixed at their respective ends by anchorpoints 31, 32, 313 and 323 which project from the outer peripheral surface 182 of the hard lens 18. The anchorpoints 31, 32, 313 and 323 comprise blocks of polymeric material made from the same material as the lens 18 that are bonded to the outer peripheral surface 182 of the hard lens 18. For clarity purposes, the SMA ribbon actuator assemblies r1, r2, r3 are shown in FIG. 9 as twisted towards the viewer (i.e. as they are in FIGS. 8A to 8C) whereas in practice they will sit against the outer peripheral surface 182 of the hard lens 18, as described below. Furthermore, while the anchorpoints 31, 32, 313 and 323 which project from the hard lens 18 are shown in FIG. 9, the hard lens 18 has been omitted. As can be seen, actuator assemblies r2 and r3 are both connected to anchorpoint 313 on opposite sides of anchorpoint 313. Similarly, actuator assemblies r1 and r3 are both connected to anchorpoint 323 on opposite sides of anchorpoint 323 Features 31, 32, 313 and 323 are anchorpoints where the assemblies r1, r2, r3 are anchored to the hard lens 18.

FIGS. 14 to 19 show details of the construction of one of the actuator assemblies, in this case r1. However, it should be noted that the construction of actuator assemblies r2 and r3 is substantially identical to r1. The actuator assembly r1 comprises an elongate electrically insulating ribbon housing 511 having a shallow U-shaped cross-section formed by two opposing arms 5111, 5112 that are spaced apart by and project away from a floor section 5113. The SMA wire array 531 is supported along the length of the housing 511 by a plurality of comb-like structures 54 that are spaced apart along the floor section 5113 of the ribbon housing 511. Each comb-like structure 54 is formed by an elongate member having a multiplicity of transversely running grooves 55 spaced apart along the comb-like structure 54. Each comblike 54 structure is positioned transversely on the floor section 5113 of the ribbon housing 511 such that the grooves 55 run in a direction parallel with the length of the housing 511. As can be best seen in FIGS. 15 and 16, the individual SMA wires 53 of the array 531 are supported in the grooves 55 of the comb-like structures 54 and run the length of the housing 511.

A power ribbon or control signal bus array 521 comprising conducting electrical wires 58 in an insulating ribbon structure 580 is held above the array 531. The signal/power ribbon 521 is held at each of its sides between a pair of lips 5114 that project from the inside surfaces of the arms 5111, 5112 and run along the length of the housing 511. The signal/power ribbon 521 runs the length of the housing 511, parallel to the array 531, supported between the lips 5114. The SMA wires 53 that form the array 531 are addressed by wires 501 that come from the signal/power ribbon 521.

In the presently described embodiment of the invention, the comb-like structures 54 are electrically conductive and so the addressing wires 501 are connected between electrically conducting wires 58 of the signal/power ribbon 521 and the comb-like structures 54 to provide a voltage across the lengths of SMA wire 53, as shown in FIGS. 15 to 17. However, in other embodiments such as that shown in FIGS. 18 and 19, the comb structures 54' may be electrically insulating and the individual SMA wires 53 may be addressed individually by wires 501 from electrically conducting wire 58.

To mount the ribbon actuator assembly r1 upon the lens assembly 100, the outer surface of the floor section 5113 of the housing 511 is bonded to the outer circumferential surface 182 of the hard lens 18. Each of the housings 511, 512, 513 of the respective ribbon actuator assemblies r1, r2, r3 are bonded to the hard lens in substantially the same way. As an example, FIG. 12 shows the housing 513 of the ribbon actuator assembly r3 as bonded to the hard lens 18. Bonding of the housings 511, 512, 513 to the hard lens 18 can be achieved using a suitable adhesive (e.g. Delo® MF643 UV curing epoxy adhesive) or other means such, for example, as ultrasonic welding, laser welding and the like. In the present embodiment of the invention, the housings 511, 512, 513 are made from a resilient polymer and bends to confirm with the outer circumferential surface 182 of the hard lens 18. However, in other embodiments, the housings 511, 512, 513 may not be resilient and may instead be formed with an arcuate shape that conforms to the outer circumferential surface 182 of the hard lens 18.

As will be described below, the actuator assemblies r1, r2, r3 are configured to actuate the supporting ring 14 in the z-direction at a number of active control tabs spaced around the ring while the supporting ring 14 is fixed in the z-direction at a number of static control points, which also act as hinge points, that are spaced around the supporting ring 14. The number and positions of the active and static control tabs are dependent on the shape of the lens assembly 100 and the desired degree of accuracy for shaping the membrane 15 into a spherical, or other shape, optical surface. In the present embodiment, there are three active control tabs a1 to a3 with corresponding actuators r1 to r3 and four static control tabs s1 to s4. As can be seen in FIG. 6, there are two active control tabs a1, a2 at the temple-side of the lens, and one active control tab a3 in the nasal region. One static control tab s1 is located at the top of the lens, one static control tab s2 is located at the bottom of the lens, and two static control tabs s3, s4 on the nasal-side of the lens assembly 100. In other embodiments, there may be more or fewer tabs as required. In general, there should be a minimum of at least three tabs for stability.

FIGS. 8A, 8B and 8c are schematic diagrams showing how the ribbon actuator assemblies r3, r2, and r1 respectively connect with a1, a2, a3. Considering r3 as an example, the SMA wire array 533 is connected at its ends to yokes or harnesses 443, 663 that are in turn connected to tension members or cables 43 and 63 respectively. In practice the SMA wire arrays may comprise between 5 and 100 individual SMA wires. However, in this specific example each SMA wire array 531, 532, 533 each comprises sixteen wires, as can be best seen in FIG. 15. Tension cable 43 is anchored at anchorpoint 323 in the side surface 182 of the in hard lens 18. Cable 63 on actuation point is attached to both a pivoting linkage 83 and to a return spring 73. Return spring 73 is anchored in anchorpoint 313 which protrudes from the side surface 182 of the hard lens 18. The pivoting linkage 83 is substantially 'L' shaped and is pivotally mounted at the elbow 831 of the pivoting linkage 83 to a pin 803 that is anchored in the hard lens 18, the pivoting linkage 83 thereby being pivotable about the pin 803. The pivoting linkage 83 is connected to both the return spring 73 and cable 63 at a first end 832 of the pivoting linkage 83 on a first side of the pin 803 and is connected to tension member 103 at a second end 833 of the pivoting linkage 83, on a second, opposite side of the pin 803, as best seen in FIGS. 12 and 13. The tension member 103 passes through a hole in the active control tab a3 and comprises a cap 93 at the distal end of the tension member 103 configured such that the tension member 103 cannot be pulled back through the active control tab a3 towards the pivot linkage 83. The SMA wire array 533 is addressed in longitudinal sections by electrical wires 503 connected to an electronic bus 523 that is supplied by power supply and control electronics 300, as shown in FIG. 8A.

Actuation of the each of the active control tabs a1, a2, a3 is effected in substantially the same way by supplying current to the one or more longitudinal sections of SMA wire array 531, 532, 533, causing SMA wires to heat up and contract as described above.

Although the SMA wire arrays 531, 532, 533 are shown schematically in FIGS. 8A to C as being split into longitudinal sections 581, 582, 583 having equal length, in embodiments of the invention the wire arrays 531, 532, 533 may have sections of differing length, so that wire arrays can be actuated in fixed increments. For example, as discussed above, for a lens having a 2 dioptre to 4 dioptre power range it may be preferable that the power of the lens is changed in fixed increments in between 16 to 32 steps over its power range. This can be achieved by dividing the wire array into longitudinal sections of varying length. For example, by dividing a wire of length L into six sections: L/32, L/16, L/8, L/4, L/2, L/32, any one or a combination of those sections can be actuated to actuate the SMA wire array in 32 equal steps between the maximum and minimum lengths of the SMA wire.

The process of actuating active control tab a3 is described in more detail below with reference to FIG. 8A, and FIGS. 10 to 13. FIG. 10 is a close-up view of Detail E as labelled in FIG. 6 and FIG. 11 is a close-up view of View D as labelled in FIG. 6. FIG. 12 is a close-up view of the lens assembly in the direction of the arrow labelled "Up" in FIG. 10 and FIG. 13 is a close-up view of the lens assembly in the direction of the arrow labelled "Down" in FIG. 10.

When current is supplied to sections of the SMA wire array 533, the wire in those sections heats up and undergoes the Martensitic to Austenitic phase change, causing the wire on those sections to contract. Contraction of the wire array 533 causes the cable 63 to pull against the resilient bias of the return spring 73 and to move the first end 832 of the pivoting linkage 83 such that the pivoting linkage 83 pivots about the pin 803 (anticlockwise as shown in the FIGS. 8A and 11 to 13). Rotation of the pivoting linkage 83 in this way causes the second end 833 of the pivoting linkage 83, and thereby the tension member 103, to move rearwardly along the z-axis. As the tension member 103 is pulled rearwardly along the z-axis, the cap 93 of the tension member 103 is pulled into abutment with the outer surface of the supporting ring 14 in the region around the hole in the active control tab a3. The active control tab a3 is thereby pulled rearwardly along the z-axis by the tension member 103 as the pivoting linkage 83 is rotated by contraction of the SMA wire array 533.

When the voltage applied to the sections of SMA wire array 533 is reduced to an appropriate level, or stopped, the SMA wire in those sections cools down and undergoes the Austenitic to Martensitic phase change, as described above. As the wire array cools 533 it returns to its "cold" length under the action of return spring 73, as this happens linkage 83 rotates in the opposite direction allowing the tab a3 to move forwardly along the z-axis, away from the hard lens 18 under pressure from the optical fluid 16.

A schematic drawing of a lens control system is shown in FIG. 20, the lens assembly 100, or a device incorporating the lens assembly 100, for example the eyeglasses 2000, is provided with power and control unit 300 comprising control electronics 402, power supply 403 and one or both of user input 400 and eyetracking system 401. User input 400 may be via an interface on the eyeglasses 2000. Alternatively, the control system may further comprise a wireless communication device, for example a mobile phone or tablet, and the user input 400 may be provided wirelessly via an app installed on the mobile phone or tablet. Other inputs such as distance sensors to sense objects in the user's field of view may be used. Electronic busses 521, 522, 523 for power and signal supply to and from SMA wire arrays 531, 532, 533 are connected to control electronics 402. Control of the lengths of the SMA arrays 521, 522, 523 is done in part or in whole by the control electronics 402 measuring the electrical resistance of SMA array sections and, as such, the control electronics 402 in the present embodiment are configured to measure both the voltage and current supplied to each section.

In addition, various sensors or switches may be provided and connected to the control electronics 402, including any of: pressure sensor 25; temperature sensor 26; curvature sensor array 1420. The curvature sensor 1420 may consist of one or more layers of piezoelectric material deposited on a supporting ring 14. Such curvature sensors are disclosed in in PCT application number PCT/GB2019/050106, which is incorporated herein by reference.

As can be seen in FIG. 21, the lens assembly 100 may comprise various sensors for determining the position of the supporting ring 14: return spring force sensors 771, 772, 773 are provided for measuring the force in the return springs 71, 72, 73; linkage rotation sensors 881, 882, 883 are provided to measure the rotational position of the pivoting linkages 81, 82, 83; and limit switches 991, 992, 993 are provided to ensure the ring 14 does not deflect beyond maximum and minimum limits at the active control tabs a1, a2, a3. Other sensors may be provided for determining the position of supporting ring 14 or the actuation state of lens 100.

The flow diagram in FIG. 22 shows a control loop in which the various sensors described in the preceding paragraphs operate with the control electronics 402 to control the optical strength of the lens assembly by controlling the lengths of the wires in the wire arrays 531, 532, 533. The control electronics 402 may be provided by a microcontroller. However, a person skilled in the art will be familiar with other possible ways in which the control electronics could be implemented. At step 3001 the control electronics 401 calculates the length of the wire sections in the wire arrays 531, 532, 533 from the measured resistance and wire temperatures of the wires. At step 3002, the control electronics 402 then calculates the optical power of the lens assembly 100 from one or more of the wire length measured in step 3001, the pressure of the optical fluid 16 measured by pressure sensor 25, the wire temperatures measured by the temperature sensor 26, the membrane curvature measured by the curvature sensor array 1420 and/or the position of the supporting ring 14 as determined from the return spring force sensors 771, 772, 773 and or linkage rotation sensors 881, 882, 883.

At step 3003 the control electronics 402 receives from either the eye tracking system 401 or user input 400 an input signal representing an optical power desired by the user of the eyeglasses 2000. The desired optical power is then compared with the current optical power of the lens 100 as measured in step 3002. If the current optical power is equal to the desired optical power, no action is taken and the optical power of the lens is held at the same value until a next input/clock cycle, as indicated in step 3004. If the current optical power is not equal to the desired optical power then the control electronics 402 calculates in step 3005 the desired lengths of the SMA arrays 531, 532, 533 necessary to achieve the local bending/deflection of the supporting ring 14 at each active control tab a1, a2, a3 required to deform the membrane 15 to the desired optical power of the lens assembly 100. In step 3006 the control electronics changes the lengths of the SMA wire array 531, 532, 533 to the desired lengths, with the limit switches 991, 992, 993 ensuring that the maximum/minimum deflection limits of the ring 14 are not exceeded. In step 3007 the lengths of the wire arrays 531, 532, 533 are again measured as in step 3001 from the measured wire resistances and wire temperatures. The actual lengths of the wire arrays 531, 532, and 533 are compared against the desired lengths in step 3008 and if the lengths are not correct then step 3006 is repeated.

The invention claimed is:

1. An adjustable fluid-filled lens or mirror assembly comprising a fluid-filled envelope and a supporting structure therefor; the fluid-filled envelope being constituted by a first wall which is formed of a distensible elastic membrane having an exterior optical surface of variable curvature, a second wall which is spaced from the first wall on a z-axis, and a collapsible peripheral side wall which extends between the first and second walls, and being filled with a substantially incompressible fluid; a membrane holding structure which is attached to a peripheral edge of the membrane for holding the membrane under tension; and one or more selectively operable actuator assemblies for moving one or more corresponding regions of the peripheral edge of the membrane on the z-axis towards or away from the second wall for controlling the profile of the peripheral edge of the membrane; wherein the or each actuator assembly comprises a connecting member that is attached to the membrane or membrane holding structure at a respective actuation point, a linear actuator which is mounted to the supporting structure and a linkage which is connected between the connecting member and an actuation point on the linear actuator; wherein the linear actuator is a linear SMA actuator comprising an array of SMA wires which are coupled together to work in parallel and which extend transversely of the z-axis, and the linkage is configured for converting linear motion of the actuation point of the SMA actuator in a direction transverse the z-axis to linear motion of the connecting member on the z-axis, thereby to move the corresponding region of the peripheral edge of the membrane towards or away from the second wall, and wherein the individual SMA wires are accommodated within a plurality of comb-like structures that are spaced longitudinally along the SMA wire array.

2. The adjustable fluid-filled lens or mirror assembly of claim 1, wherein the linear SMA actuator is attached to the supporting structure to extend circumferentially around the fluid-filled envelope.

3. The adjustable fluid-filled lens or minor assembly of claim 1, wherein the linear SMA actuator comprises a first yoke member which is attached to the SMA wire array at one end thereof and anchored to the supporting structure, a second yoke member which is attached to the SMA wire array at another end thereof, a tension member which is attached to the second yoke member, and a return spring which is connected to the tension member and anchored to the supporting structure; wherein the linkage is connected to the tension member at the actuation point.

4. The adjustable fluid-filled lens or mirror assembly of claim 1, wherein the linkage comprises a pivoting linkage that is secured to the supporting structure.

5. The adjustable fluid-filled lens or mirror assembly of claim 1, wherein the membrane holding structure comprises a bendable membrane supporting ring.

6. The adjustable fluid-filled lens or mirror assembly of claim 5, wherein the second wall is provided by a surface of a substantially hard member or a layer of material that is supported on the surface of the hard member and the SMA wire array of the or each actuator is arranged circumferentially around at least part of a periphery of the hard member; and wherein the individual SMA wires of the SMA wire array are held at each end by a yoke which is attached to the hard member or one or more parts connected thereto, or to a housing for the lens assembly; and wherein the yoke at one end of the SMA wire array is attached to the supporting ring through the linkage such that power developed by the SMA wire array is transmitted to the supporting ring via the linkage.

7. The adjustable fluid-filled lens or mirror assembly of claim 6, wherein the linkage comprises a pivoting linkage and a tension member.

8. The adjustable fluid-filled lens or mirror assembly of claim 7, wherein the pivoting linkage is pivoted to the hard member or a part connected thereto or to a housing for the lens or mirror assembly.

9. The adjustable fluid-filled lens or mirror assembly of claim 6, wherein the SMA wires are held at one end by a yoke that is attached to the hard member or part connected thereto through a return spring for returning the SMA wire array to its extended state.

10. The adjustable fluid-filled lens or mirror assembly of claim 9, wherein the supporting ring is substantially circular or non-round.

11. The adjustable fluid-filled lens or mirror assembly of claim 1, wherein the or each SMA wire array comprises between 5 and 100 individual SMA wires.

12. The adjustable fluid-filled lens or mirror assembly of claim 1, wherein the SMA wires have a length of up to 50 mm.

13. The adjustable fluid-filled lens or mirror assembly of claim 1, wherein the assembly comprises one, two, three or more actuation points.

14. The adjustable fluid-filled lens or mirror assembly of claim 1, further comprising an electronic bus for addressing separate longitudinal sections of the SMA wire array.

15. The adjustable fluid-filled lens or mirror assembly of claim 14, wherein the electronic bus is configured to supply a pulse-width-modulated voltage to the individual longitudinal sections of the array.

16. The adjustable fluid-filled lens or mirror assembly of claim 1, wherein each SMA actuator comprises a plurality of electrical supply wires for directing current to longitudinally contiguous sections of the SMA wire array.

17. The adjustable fluid-filled lens or mirror assembly of claim 16, wherein the individual SMA wires are accommodated within a plurality of non-conductive comb-like structures that are spaced longitudinally along the SMA wire array and the electrical supply wires are connected to individual SMA wires by connecting wires.

18. The adjustable fluid-filled lens or mirror assembly of claim 1, further comprising a control circuit that is configured to supply pulse modulated voltage to the or each SMA actuator; wherein the frequency of the pulses is variable for adjusting the length of the SMA wires.

19. The adjustable fluid-filled lens or mirror assembly of claim 1, wherein the distensible membrane that is held around its periphery by a bendable supporting ring, the assembly further comprising control electronics for controlling the operation of the one or more SMA actuators for displacing the supporting ring at the one or more actuation points according to a desired focusing power.

20. The adjustable fluid-filled lens or mirror assembly of claim 1, further comprising an eye-tracking device to determine the point of gaze or vergence of a user and adjust the focusing power of the lens or minor assembly accordingly.

21. The adjustable fluid-filled lens or mirror assembly of claim 1, further comprising one or more sensors for determining the actuation state of the lens or mirror assembly.

22. Eyewear comprising one or more lens assemblies as claimed in claim 1.

* * * * *